(12) United States Patent
Hopprich et al.

(10) Patent No.: US 7,792,993 B1
(45) Date of Patent: Sep. 7, 2010

(54) APPARATUS AND METHODS FOR ALLOCATING ADDRESSES IN A NETWORK

(75) Inventors: John Hopprich, San Francisco, CA (US); John G. Waclawsky, Fredrick, MD (US); Dean Hiller, Shrub Oak, NY (US)

(73) Assignee: Cisco Technology, Inc., San Jose, CA (US)

( * ) Notice: Subject to any disclaimer, the term of this patent is extended or adjusted under 35 U.S.C. 154(b) by 1069 days.

(21) Appl. No.: 10/921,663

(22) Filed: Aug. 19, 2004

(51) Int. Cl.
*G06F 15/16* (2006.01)
*G06F 15/173* (2006.01)

(52) U.S. Cl. ...................... 709/245; 709/238
(58) Field of Classification Search ......... 709/238–240, 709/245, 203, 217–219
See application file for complete search history.

(56) References Cited

U.S. PATENT DOCUMENTS

| | | | |
|---|---|---|---|
| 5,812,819 A | 9/1998 | Rodwin et al. | |
| 6,052,725 A | 4/2000 | McCann et al. | |
| 6,249,820 B1 | 6/2001 | Dobbins et al. | |
| 6,308,273 B1 * | 10/2001 | Goertzel et al. | 726/9 |
| 6,351,773 B1 * | 2/2002 | Fijolek et al. | 709/228 |
| 6,393,484 B1 | 5/2002 | Massarani | |
| 6,427,170 B1 | 7/2002 | Sitaraman et al. | |
| 6,442,616 B1 | 8/2002 | Inoue et al. | |
| 6,452,925 B1 | 9/2002 | Sistanizadeh et al. | |
| 6,460,081 B1 | 10/2002 | Doherty et al. | |
| 6,469,998 B1 | 10/2002 | Burgaleta Salinas et al. | |
| 6,591,306 B1 * | 7/2003 | Redlich | 709/245 |
| 6,738,382 B1 * | 5/2004 | West et al. | 370/401 |
| 6,792,474 B1 | 9/2004 | Hopprich et al. | |

* cited by examiner

*Primary Examiner*—Yasin Barqadle
(74) *Attorney, Agent, or Firm*—Brinks Hofer Gilson & Lione

(57) ABSTRACT

An address assignment mechanism allows an address server to receive requests for network addresses from computer systems. Based on an identity of the requesting computer system, the address server selects an address for use from local addresses or guest addresses. If the address server identifies the requesting computer system as a guest computer system, then a guest address selected from a set of guest addresses is assigned and provided to that computer system, whereas if the address server identifies the requesting computer system a local computer system then the address server selects and assigns a local address (from the set of local addresses) to the requesting local computer system. Data communications devices selectively route data portions sent from computer systems depending upon if those data portions contain guest addresses or not. Selective transport therefore restricts access to certain parts of the network if the data portion contains a guest address.

18 Claims, 4 Drawing Sheets

APPARATUS AND METHODS FOR ALLOCATING ADDRESSES IN A NETWORK

RELATED APPLICATIONS

This patent application claims the benefit under 35 U.S.C. §120 of U.S. patent application Ser. No. 09/536,648, Filed Mar. 27, 2000, Entitled "Apparatus and Methods for Allocating Addresses in a Network," the entire contents of which are hereby incorporated by reference.

BACKGROUND OF THE INVENTION

A typical data communications network includes an interconnection of one or more data communications devices and data links that support the exchange of information between a number of host computer systems coupled to the network. A few interconnected devices (computer systems and data communications devices) may form such a network, or there may be many hundreds or thousands of such devices in a single network. Typically, an organization such as the federal government, a corporation, or an educational institution independently owns, manages and operates the data communications devices, computer systems and data links that form a data communications network. Those skilled in the art generally consider a network such as the Internet to be a large collection of the separate but interconnected, independently owned and managed data communications networks.

Generally, data communications networks operate by transporting data portions such as packets, cells, frames or the like (collectively referred to herein as packets) over the interconnection of data links in the network between various computer systems and data communications devices. Each computer system and data communications device on a data communications network typically requires at least one associated network address to perform data communications on the network. The network address is frequently a numerical arrangement such as an Internet Protocol (IP) address of the form "N.N.N.N" where each N ranges between "0" and "255". An address uniquely identifies a device such as a single computer system within the network. Data communications devices can use the address of a specific computer system, for example, to route and deliver packets of data to that system as opposed to other computer systems within that network, much like a postal address uniquely identifies a specific delivery destination for a parcel of mail.

As an example, to send data through a data communications network, a source computer system (e.g., an end user host computer) creates a packet of data and places a destination address of a destination computer system into a field in the packet and then transmits the packet onto the network. Data communications devices in the network such as routers and switches that receive the packet can examine the destination address of the packet and can transmit the packet onto appropriate data link(s) in order to forward the packet towards the computer system specified by the destination address of the packet. Data packets travel across the network in this manner, data link by data link (i.e., hop by hop), until they eventually reach the portion of the network (i.e., the data link or sub-network) that contains a coupling to the computer system specified by the destination address in the packet. The destination computer system can detect and receive the packets and extract the data within the packets for use by an application.

The devices (computer systems and data communications devices such as routers and switches) within a single data communications network frequently are configured to operate using a set of related network addresses. The group or range of related addresses that can be used for devices within a network is sometimes called the "domain" of the network. To obtain a range of addresses for use in a network such as the Internet (i.e., to obtain a domain), a system administrator (a person responsible for managing devices and computer systems within a network) requests the domain from a network address assignment organization such as Network Solutions Corporation (formerly known as InterNIC). The purpose of the network address assignment organization is to ensure that a domain and any associated address range assigned to computer systems within a particular network is/are not duplicated elsewhere (e.g., within another interconnected network). An example of a network domain is the familiar "dot com" notation such as "company.com," where "company" is the name of a commercial organization to which the domain is assigned. Within a data communications network, the domain "company.com" translates into a specific network address and defines a range of sub-addresses that can be used within a network of this domain.

Data communications system developers have created various prior art mechanisms to assign individual network addresses to devices that are coupled to a data communications network. As a simple example, a systems administrator can manually configure each computer system or data communications device in a network with a specific network address. A network address assigned to a particular computer system should, in most cases, be unique to that host. This avoids instances of address duplication in which two hosts are accidentally assigned the same network address. Address duplication is a common error that can occur when a systems administrator uses a manual configuration process to assign network addresses in a network.

Many computer networks are divided into sub-networks. Each sub-network typically couples a number of computer systems together that have a related purpose, such as the computer systems in an engineering department, an accounting department, and so forth. Typically, for proper network operation, a systems administrator should configure all computer systems coupled to a specific sub-network with a sub-range of related addresses. However, computer systems are sometimes moved from one sub-network to another. Each time a computer system is moved in this manner, the systems administrator must manually re-configure the address for the computer system to properly operate on the next sub-network to which it is coupled. Again, the process of manually configuring network addresses can become quite cumbersome and is prone to error.

To solve such problems and to simplify the process of assigning addresses to computer systems (or other networked devices), data communications system developers have created prior art address assignment protocols that can dynamically assign network addresses to computer systems and devices in an automated manner. One example of such a prior art address assignment protocol is the Dynamic Host Configuration Protocol (DHCP). While a brief overview of DHCP is provided below, complete details on the operation of DHCP can be found in the DHCP standard, which is fully documented in Request for Comment 2131 (RFC-2131) which is now an Internet standard and is maintained by the Internet Engineering Task Force (IETF). RFC-2131 is hereby incorporated by reference in its entirety. Documentation for such standardized network protocols including RFC-2131 is available on the World Wide Web at a web site maintained by the IETF.

A DHCP server maintains a range or set of available network addresses that may be dynamically assigned, as needed, to computer systems or other devices that couple to the network and request an address for use on that network from the DHCP server. More specifically, when a computer system is coupled to a sub-network within a network and is started-up or "booted" (i.e., the computer is powered on and begins operation), a DHCP client within the computer system sends a DHCP request message onto the network to request specific information required for operation within the network. The DHCP request message can include a request for an assignment of a network address for use by that computer system on the network. One or more DHCP servers that detect such a request can respond or "offer" to service the request. There might be a few DHCP servers in a network, for example, to provide redundancy in the event that one DHCP server fails in some manner. The DHCP client in the computer system initiating the original DHCP request message can receive the "offers" from each DHCP server and can select one of such offers. The DHCP client can thereafter communicate with that selected DHCP server to obtain the required network address (and possibly other configuration information). The selected DHCP server selects and assigns a network address from the range of available addresses (i.e., the domain) for the requesting computer system and returns the address to the computer system. The DHCP server then informs the other DHCP servers (if others exist) that the selected address is now in use on the network by a specific computer system and that this address should not be subsequently selected for assignment to another computer system until it is released by the computer system.

In this manner, computer systems can be coupled and de-coupled at any time to various sub-networks of a computer network and can negotiate with a DHCP server for an appropriate address for use on that network sub-network. DHCP thus avoids the process of manually configuring an address for use by each computer system each time that computer system is placed on the network or is moved from one sub-network to another.

SUMMARY OF THE INVENTION

While prior art address assignment mechanisms such as DHCP make the process of assigning addresses to computer systems easier and less prone to error, they do little to provide security or access control within the network environment in which they operate. By way of example, a typical implementation of prior art DHCP will service or provide "offers" to any computer system that requests an assignment of an address for use on a network. If a malicious computer user (e.g., a hacker) couples his or her computer system to a network, a prior art DHCP server within that network will provide that computer system with a valid address in response to a request. The address allows the computer system to perform data communications on the network. There is generally no authentication that takes place between the prior art DHCP client and the prior art DHCP server to determine if the computer system requesting the address is authorized or has permission to obtain the address for use on the network.

Another problem with prior art DHCP servers is that they operate to select addresses for use on the network from a common pool, set or range of addresses. For example, if a company owns a number of computer systems and couples these to a sub-network, each computer system can use its DHCP client to request an address for use on that sub-network from the company's DHCP server. Likewise, if a guest or visitor to the corporation (friendly or malicious) also couples his or her guest computer system (e.g., a laptop computer) to the same sub-network, the DHCP client on the guest computer system can also request an address from the DHCP server. The DHCP server will select and assign an address to the guest computer system from the same pool or set of address from which address selection was made for the company's own requesting computer systems, and as indicated above, the DHCP server will do so without any authentication or verification of an identity of the guest computer system.

Prior art DHCP processing thus results in the guest computer system having an address that is indistinguishable from addresses assigned to the company's own computer systems. In other words, the DHCP server as well as all other network components such as the company's data communications devices (routers, switches, hubs, gateways, proxy servers, etc.) and other company owned computer systems are unable to distinguish data communications (e.g., packets) sent from or to the guest computer system versus data communications sent to or from the company's own computer systems. To this end, the guest computer system has the ability to transfer data communications (e.g. packets) to any and all data communications devices and computer systems anywhere within the DHCP domain. Using such prior art DHCP technology, password or login protection schemes implemented within specific corporate computer systems or data communications devices are the only measure of network security.

The present invention is based in part on the observation that other address assignment techniques such as DHCP can be extended according to this invention to provide an address assignment scheme that provides significantly enhanced network security. Generally, the invention allows an address assignment mechanism such as DHCP to distinguish between guest computer systems and local (e.g., company owned) computer systems that request an address. Based on this guest or local computer system distinction, a DHCP server configured according to this invention, for example, can select and assign guest network addresses to guest computer systems within a local network, and can select and assign local network addresses to local computer systems within the local network. In other words, the invention reserves a set of guest network addresses for assignment to guest computer systems and uses another set of local network addresses for assignment of addresses to local computer systems. A local network and local computer systems are generally defined as a network (e.g., a company's network) of computer systems that are under the management and control of a single entity and that are served by an address server (e.g., DHCP server) configured according to this invention.

The invention further allows local computer systems and data communications devices within the local network to be aware of the guest address range (or of specific guest addresses) assigned to guest computer systems (or other guest computerized devices). This allows, for example, local data communications devices within the network to limit the number of routes upon which data communications (e.g. packets) sent to or from a guest computer system are transported. As a specific example, data communications devices in a local network might transport guest data communications that contain a guest network address only on certain sub-networks within the network and not on others.

Aside from the general operation of assigning guest addresses to guest computer systems and local addresses to local computer systems, the system of the invention also provides a robust authentication and verification technique that allows a local address server of the invention to authenticate and verify the identity of a computer system or other device (guest or local) requesting assignment of an address. This allows an address server of the invention, for example, to verify that a computer system is either a guest or a local computer system for address selection (i.e., guest or local) and assignment purposes. The verification and authentication techniques of the invention can confer with a remote network verification computer system, such as a remote address server, to confirm that a guest computer system is a member of a remote domain, for example.

More specifically, the system of the invention includes mechanisms, techniques, steps, operations, arrangements, and configurations (all of which are considered embodiments as explained below) for assignment of addresses to requesting computer systems. In one embodiment, the system of the invention provides a method for assigning an address to a computer system. The method includes the steps, techniques and operations of receiving, from a computer system coupled to a first network, a request for an assignment of an address and assigning a guest address as the address for the computer system if the computer system is identified as a guest computer system and assigning a local address as the address for the computer system if the computer system is identified as a local computer system. If the operation of assigning assigns a guest address or a local address to the computer system (it might in some circumstances assign neither), then the operation provides the address assigned to the computer system to the computer system on the first network to allow the computer system to perform data communications on the first network. Since a guest computer is assigned a guest address, all data communications to and from this guest computer system will contain the guest address. As such, data communications devices within the first network can be configured with restricted network access routes that allow data portions containing the guest address to only be routed to certain locations, such between a sub-network containing the guest computer system and the Internet.

In another configuration, the step of assigning includes the steps of determining if the computer system coupled to the first network is a guest computer system or a local computer system. If the system of the invention determines that the computer system is a guest computer system, the operation of selecting an address for the computer system from at least one set of guest addresses is performed, whereas if it is determined that the computer system is a local computer system, the operation of selecting an address for the computer system from a set of local addresses is performed. Since at least two sets of addresses are maintained (a local and at least one guest set), network access control can be provided depending upon which address is assigned to a specific computer system.

According to another configuration, the step of determining discussed above makes a determination if the computer system coupled to the first network is at least one of a guest computer system and a local computer system based on the request for an assignment of the address.

In yet another arrangement, the step of determining if the computer system coupled to the first network is a guest computer system or a local computer system includes the steps of determining if the computer system purports to be associated a remote domain of a second network, and if so, communicating with a verification computer system on the second network to verify if the computer system is associated with the remote domain. This allows an address server such as a DHCP server configured according to the invention to verify the authenticity of a requesting computer system. The operation continues by receiving an indication, from the verification computer system on the second network, that indicates if the computer system is associated with the remote domain or not.

In certain configurations of the invention, encryption (e.g., public key technology) is used for communications between various system components to verify the authenticity and identity of the components involved in communications with each other. For example, in one embodiment, the operation of receiving an indication from the verification computer system (which itself may be an address server for the second network) on the second network includes the steps of obtaining clear text information and a doubly encrypted version of the clear text information in the indication from the verification computer system. The operation continues by obtaining a public key associated with the verification computer system and decrypting the doubly encrypted version of the clear text information with a private key of an address server receiving the indication to produce a result and then decrypting the result with the public key of the verification computer system to produce a final result. Then, the operation compares the final result with the clear text information to verify the authenticity and identity of the verification computer system.

In another arrangement, the operation of selecting an address for the computer system from one set of guest addresses selects a guest address for the computer system based on an identity of the computer system as specified in the indication received from the verification computer system on the second network.

In another configuration, the set(s) of guest addresses includes a plurality of sets of guest addresses and the step of selecting an address for the computer system from a set of guest address includes the steps of determining an identity of the computer system requesting an assignment of an address and selecting one set of guest addresses from the plurality of sets of guest addresses based on the identity of the computer system requesting an assignment of an address. Then, the operation selects the address for the computer system from the selected one set of guest address that is selected from the plurality of sets of guest addresses. There may be multiple sets of guest addresses, for example, to enforce different levels of access control within the network. For instance, one set of guest addresses may allow guest computers to have access to certain sub-networks, while another more restrictive set of guest address may allow little or no access to any components within the local network, but may provide a tunnel out to the Internet.

In one such an embodiment, the plurality of sets of guest addresses includes a set of more restrictive guest addresses and a set of less restrictive guest addresses. Data communications devices within the first network in this embodiment are configured to provide data transport facilities to a component on the first network for data portions transported in the first network that have a guest address selected from the less restrictive guest addresses. The data communications devices are further configured to provide no data transport facilities to the same component on the first network for data portions transported in the first network that have a guest address selected from the more restrictive guest addresses. It may be the case the identity of a guest computer system turns out to be associated with a remote domain of a competing company, for example. In this case, the more restrictive guest address assignment causes the data communications device to prevent the competitor guest computer system from penetrating the local network and provides enhanced security.

In another embodiment, the invention propagates the set (or sets) of guest addresses to data communications devices within the first network such that the data communications devices within the first network provide limited transport of data communications messages that use a guest address as specified in the at least one set of guest addresses.

In another configuration, the invention includes the operation of determining if the computer system coupled to the first network is an un-trusted computer system, and if so, providing an indication to the computer system that no address has been assigned for use on the first network.

In yet another configuration, the operation of determining if the computer system coupled to the first network is an un-trusted computer system includes the operations of determining a remote domain of a second network with which the computer system purports to be associated and determining if the remote domain is different than a local domain of the first network, and if so, identifying the computer system as an un-trusted computer system, and if not, identifying the computer system as a local computer system.

In yet still another configuration, the operation of determining if the computer system coupled to the first network is an un-trusted computer system includes the operations of determining a remote domain of a second network with which the computer system purports to be associated and determining if the remote domain is different than a local domain of the first network, and if so, identifying the computer system as a guest computer system, and if the domain of the computer system is not different than the domain of the first network, identifying the computer system as a local computer system.

According to another configuration, the operation of determining if the computer system coupled to the first network is an un-trusted computer system includes the operations of determining a domain of a second network with which the computer system purports to be associated and communicating with a verification computer system on the second network to verify if the computer system is associated with the domain of the second network. The operation also includes receiving an indication from the verification computer system on the second network that indicates if the computer system is associated with the domain of the second network, and identifying the computer system as a guest computer system if the indication indicates that the computer system is associated with the domain of the second network. Alternatively, this same configuration includes the operation of identifying, if the indication indicates that the computer system is not associated with the domain of the second network, that the computer system is an un-trusted computer system. This allows an address server performing such operation to properly identify a requesting computer system as either a guest, a local or an un-trusted computer system.

In another configuration, if the computer system is a guest computer system, a data communication device within the first network that receives data portions containing the guest address selectively transports the data portions containing the guest address only on routes designated for transport of the data portions containing the guest address. This allows the network to provide access control based on address assignments.

In accordance with another arrangement, the computer system is assigned a guest address which allows the computer system coupled to the first network to send and receive data communications through selective routes established on the first network that provide access only to other computer systems that are not associated with the first network. In other words, this arrangement only provides a "tunnel" of access to other networks through the first network, thus preventing a guest computer system from "hacking" into the first network.

In another configuration, the address server on the first network is a Dynamic Host Control Protocol server and uses a version of the Dynamic Host Control Protocol that employs the operations of receiving a request, assigning an address (guest or local) and providing the address to a computer system in order to provide address assignments to guest and local computer systems that are coupled to the first network. This embodiment thus provides an extension to a DHCP equipped address server to provide further functionality and access control.

Other arrangements of the invention provide that the operation of receiving, receives the request for an assignment of an address from a computer system in a secure manner that uses key encryption technology to verify and authenticate the identity of the computer system requesting an assignment of an address. Public or private key encryption technology may be used, though preferred embodiments use public key technology, as will be explained. Such embodiments provide for even further security via secure verification and authentication of parties such as the address server, computer systems and remote verification systems in a communications session.

In another embodiment, when an address server receives the request for an assignment of an address, the operation of receiving includes the steps of obtaining clear text information and a doubly encrypted version of the clear text information contained in the request for an assignment of an address from the computer system and obtaining a public key associated with the computer system. Then, this embodiment decrypts the doubly encrypted version of the clear text information with a private key of the receiver of communication to produce a result and then decrypts the result with the public key of the computer system to produce a final result. The operation then includes the step of comparing the final result with the clear text information to verify the authenticity and identity of the computer system requesting an assignment of an address. In this manner, security is assured.

Other embodiments of the invention include a method for providing network security using address assignments. In one such embodiment, the method, which preferably operates in a data communications devices in a first network, comprises the steps receiving guest network address information indicating a computer system coupled to a first network has been assigned a guest address and is a guest computer system of the first network. This allows data communications devices in the network to have "knowledge" of guest address information such as sub-network guest address ranges, guest address assignments, and so forth. The operation also includes the steps of configuring at least one selective route within the data communications device upon which data portions containing the guest address may be transported through the data communications device and then transporting data portions containing the guest address using only one protective route within the data communications device and not on other routes within the first network so as to inhibit the computer system that has been assigned the guest address from performing data communications on routes in the first network other than the protective route(s). This operation is generally referred to herein as selective transport or routing.

In another embodiment, the step of configuring at least one protective route within the data communications device configures a route to allow data portions that contain the guest address to be transported to a network device coupled to another network other than the first network.

In still another embodiment, the guest address is contained in a source location of the data portion that indicates an identity of the computer system that originated the data portion and wherein the guest network address information is received from an address server on the first network.

The invention also provides embodiments related to configurations of computerized devices. According to some of such embodiments, an address server computer system is provided that includes a network interface coupled to a first network, a processor, a memory system encoded with address assignment instructions and encoded with at least one set of guest addresses and a set of local addresses, and an interconnection mechanism coupling the one communication port, the processor, and the memory system. In this arrangement, the processor performs the address assignment instructions encoded within the memory system to cause the address server to perform the operations related to address assignment, authentication, and verification, as summarized above. In one particular embodiment, these operations cause the processor to receive, via the network interface, a request for an assignment of an address from a computer system coupled to the first network and assign, within the memory system, a guest address as the address to the computer system selected from the at least one set of guest addresses if the computer system is identified as a guest computer system, and to further assign a local address as the address to the computer system if the computer system is identified as a local computer system. The address server is also configured to provide, via the network interface coupled to a first network, the address assigned to the computer system, to that computer system, if at least one of a guest address and a local address are assigned to the computer system to allow the computer system to perform data communications on the first network. If neither a guest nor a local address are assigned (such as the case may be if the address server was unable to verify the identity of the guest computer system) then no address is assigned.

According to another arrangement, the processor performs the address assignment instructions encoded within the memory system to further cause the address server to determine if the computer system coupled to the first network is at least one of a guest computer system and a local computer system. If the processor performs the address assignment instructions to determine that the computer system is a guest computer system, the processor selects an address for the computer system from the at least one set of guest addresses encoded in the memory system. The benefits of multiple sets of guest addresses are outlined above, though only one set of guest addresses may be used. Alternatively, if the processor performs the address assignment instructions to determine that the computer system is a local computer system, the processor selects an address for the computer system from a set of local addresses encoded in the memory system.

In another configuration, when the processor performs the address assignment instructions encoded within the memory system to determine if the computer system coupled to the first network is at least one of a guest computer system and a local computer system, the processor also performs the address assignment instructions to cause the address server to determine if the computer system purports to be associated with a remote domain of a second network that is coupled to the first network. The address server is also configured in this embodiment to communicate, via the network interface on the first network, with a verification computer system on the second network to verify if the computer system is associated with the remote domain of the second network and to receive an indication, via the network interface on the first network, from the verification computer system on the second network, that indicates if the computer system is associated with the remote domain of the second network.

In another arrangement, the set(s) of guest addresses includes a plurality of sets of guest addresses and when the processor selects an address for the computer system from at least one set of guest address, the processor further performs the address assignment instructions to cause the address server to determine an identity of the computer system requesting an assignment of an address. The address server is also configured to select one set of guest addresses from the plurality of sets of guest addresses based on the identity of the computer system requesting an assignment of an address. If the identity, for example, indicated that the guest computer system were from an unknown domain, then the computer system can be considered un-trusted but can still receive a guest address. However, the guest address will be quite restrictive in its ability to allow data communications to be transported via the data communications devices within the first network. For instance, the data communications devices in one configuration might only provide a tunnel to other networks besides the first network. The address server is also configured to select the address for the computer system from the selected one set of guest address that is selected from the plurality of sets of guest addresses.

Other embodiments of the invention include data communications devices within the network that are configured to recognize guest computer system data communications and selectively route such data communications. For example, such embodiments include a data communications device that comprises a plurality of network interfaces for sending and receiving data portions within a network, a memory system for maintaining guest address assignment information and a processor coupled to the plurality of network interfaces and the memory system. The processor maintains a plurality of routes for data portions between the plurality of network interfaces. The processor also receives a data portion containing a guest address as determined by the guest address assignment information and the processor routes the data portion containing the guest address only on selected routes designated by the guest address assignment information as being accessible by data portions containing guest addresses. This limits the areas within a local network that a guest computer system having such a guest address can access.

In another configuration of a data communications device, the processor receives a data portion containing both a guest address and a destination address of a component within the network that is reachable via a route that is not one of the selected routes designated by the guest address assignment information as being accessible by data portions containing guest addresses. In other words, the data portion is sent from a guest computer system that is attempting to access a restricted area of the network. In this configuration, the processor denies transport of the data portion containing the guest address to the component within the network specified by the destination address in the data portion. In a related embodiment, if a guest computer systems attempts such un-allowed restricted access, the data communications device can flag a network management entity to disable access. Alternatively, the address server can be informed of this violation and can un-assign the guest address. This will disable the guest computer system from being able to perform data communications on the local network.

Embodiments of the invention also include computer program products such as disks, or other readable media that have a computer-readable medium including computer program logic encoded thereon for assigning addresses to computer systems according to the methods and configurations explained above. Such computer program logic, when executed on at least one processing unit with the computerized device, causes the processing unit to perform any or all of the aforementioned methods.

The aforementioned methods and arrangements of the invention (and those discussed in detail later) are preferably implemented primarily by computer software and hardware mechanisms within a data communications device apparatus. The computer program logic embodiments, which constitute one or more software programs, when executed on at least one processing unit with the data communications device, cause at least one processing unit to perform the techniques and methods outlined above, as well as all operations discussed herein as the invention. In other words, these arrangements of the invention are generally manufactured as computer program software code (source and/or object) which is stored on a disk, memory (e.g., firmware, PROM, RAN, FLASH, etc.), card, or within a prepackaged operating system or other such media. Such programs can be loaded into the memory of a computer or data communications device and one or more processors in the device can execute such programs and code to cause the device perform according to the operations of the invention. In such cases, the code or program(s) alone is/are embodiments or the invention, and one or more computer systems or data communications devices encoded with and operating such programs are also considered embodiments of the invention. The software to carry out the operations of the invention alone, on a disk for example, is also an embodiment. Furthermore, in this invention, an address assignment protocol such as a version or variant of DHCP that is extended with the functionality of this invention is considered an embodiment of the invention as well.

The features of the invention, as summarized above, may be employed in data communications devices and/or other computerized devices and/or software systems to control or otherwise operate such devices such as those manufactured by Cisco Systems, Inc. of San Jose, Calif. An example of a software operating system that can employ embodiments of the invention is the Cisco Internetworking Operating Systems (IOS) developed and manufactured by Cisco Systems, Inc.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The present invention is directed to techniques and mechanisms for providing network addresses to computerized devices (e.g., computer systems, data communications devices, etc.) which require such addresses to operate in a computer network environment. As discussed previously, prior art computer systems that provide address assignment protocols such as DHCP can dynamically assign an address to a computer system that is coupled to a network. A DHCP equipped computer system typically assigns an address to a computer system, for example, during the boot sequence or start-up operation of the computer system. Prior art address assignment techniques allow the computer system to perform data communications in an unlimited and unauthenticated manner on the computer network. According to the general operation of this invention, a computer system configured as an address server can assign an address to a requesting computer system (or other device) as well, but the address server can verify and authenticate the identity of the requesting computer system and can select and assign a specific address for the requesting computer system from different pools of addresses, depending upon the identity of the requesting computer system (or other device).

The pool of addresses from which the address server selects an address, and/or the address itself, can depend, for example, upon an identity of the requesting computer system, a domain associated with the requesting computer system, or upon another characteristic of the computer system that requests the address. By way of example, the address server of this invention within a local network may maintain a pool of "local" addresses and a pool of "guest" addresses. The address server can, for instance, assign a guest address selected from the pool of guest addresses to a guest computer system (e.g., one that has an identity that is unknown to the address server on the local network or one whose identity has been verified as a guest computer system). The guest address allows the guest computer system to only perform limited data communications within the local computer network. In contrast, the address server can assign a local address selected from the pool of local addresses to requesting computer systems that properly identify themselves as being associated with the local network (i.e., registered in the domain) of the address server. In other words, the address server can provide local addresses to local computer systems that are local to the same domain as the address server. The local network may provide unrestricted data communications to computer systems configured with a local address.

Figure 1:
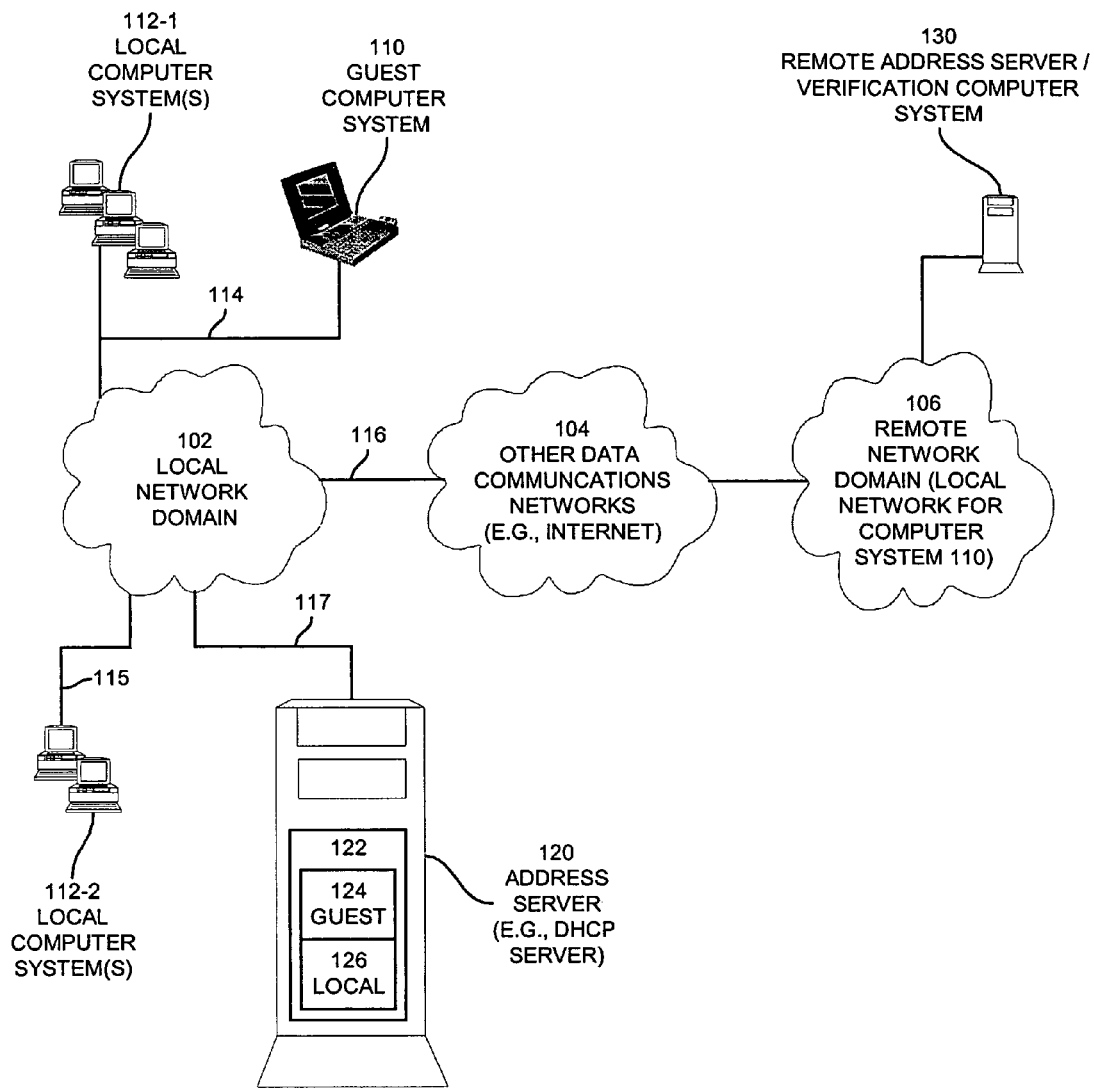
FIG. 1 illustrates a networking environment that includes an address server within a local network configured in accordance with the present invention

FIG. 1 illustrates these principles of the invention and others within an example computer network arrangement configured according to the invention. In this example configuration, a local computer network 102 having an associated local domain includes various sub-networks 114 through 117. Sub-network 114 couples the local computer systems 112-1 and a guest computer system 110 to the local network 102, while sub-network 115 couples the local computer systems 112-2 to the local network 102. Sub-network 117 couples an address server 120 configured according to one embodiment of this invention to the network 102, while sub-network 116 allows data communications traffic to be exchanged between the local network 102 and other remote data communication networks 104, 106, such as the Internet. As used herein, local network 102 generally includes the sub-networks 114 through 117, the computer systems 112, and the address server 120. Also in this example, the remote network 106 includes a remote address server/verification computer system 130.

The local network 102 (including its associated sub-networks 114 through 117) and the remote network 106 each have an associated domain which is not specifically shown in this figure. In this example, networks 102, 104 and 106 are Internet Protocol (IP) packet-based networks and a domain for either network 102 (the local domain in this example) or 106 (the remote domain) specifies a range of IP addresses that computer systems can use within that network to perform data communications.

The local network 102 in FIG. 1 uses the address server 120 to select and assign network addresses to the various computer systems (e.g., local computer systems 112 as well as the guest computer system 110) that couple to the local network 102. To do so, the address server 120 uses an address assignment protocol such as DHCP and maintains sets of addresses 122 associated with the domain of local network 102. The addresses 122 may be maintained, for example, in a database stored in memory (not specifically shown) or on a disk storage system. The address server 120 operates in this example as a DHCP server and the sets of addresses 122 for use (e.g., for selection and assignment) within the local network 102 contain a range of network addresses that a governing authority (e.g., a systems administrator of the local network 102 or Network Solutions, Inc.) has assigned to the domain for the local network 102.

According to this embodiment of the invention, the address server 120 maintains at least two sets of addresses 122, a pool or set of guest addresses 124, and a pool or set of local addresses 126. That is, the sets of address 122 associated with the domain of the local network 102 are divided into guest addresses 124 and local addresses 126. Using DHCP, the address server 120 can receive a request for an assignment of an address from a computer system (e.g., one of the computer systems 112 or 110) on the local network 102. The address server 120 can determine if the computer system requesting the address is a local computer system or a guest computer system with respect to the domain of the local network 102. Various verification and identification mechanisms will be explained in detail later that allow the address server 120 to determine if computer system requesting an address is a guest or a local computer system (or neither) with respect to the domain associated with the local network 102. The address server 120 can then assign a guest address (selected from the set of guest addresses 124) to the requesting computer system if the requesting computer system is identified as a guest computer system (e.g. guest computer system 110) with respect to the local network 102. Alternatively, the address server 120 assigns a local address (selected from the set of local addresses 126) to the requesting computer system if the requesting computer system is identified as a local computer system (e.g. one of the local computer systems 112-1, 112-2) with respect to the local network 102. If the address server 120 assigns either a guest or local address to the requesting computer system (it may deny access and assign no address), the address server 120 then provides the assigned guest or local address to the requesting computer system to allow the computer system to perform data communications on the local network 102.

According to a preferred embodiment of the invention, the local network 102 can be further configured such that if the address server 120 assigns a guest address to the requesting computer system (e.g., a guest address is assigned to guest computer system 110), then the local network 102 only provides limited transport of data communications messages such as packets that use the guest address within the local network 102.

For example, suppose the local network 102 is a corporate network having a local network domain (available network addresses 122 including local and guest addresses 124, 126) that are specific for use on the local network 102 within the company. Further suppose that the guest computer system 110 is a laptop computer system that is transported into the company by a visitor, such as a consultant. The consultant may require access via his or her computer system 110 to a network connection on sub-network 114 while working within the company. The network connection may be required, for example, in order to access a nearby printer (not shown) on the sub-network 114, or to allow applications on the guest computer systems 110 to "tunnel" (to be explained) through the local network 102 to the sub-network 116 to allow access to the Internet. Perhaps the consultant needs to get files from a computer system (not shown) within his or her local network (a network to which guest computer system 110 is considered local). For purposes of this example, the address server 120 considers remote network 106 the "local" or "home" network of the guest computer system 110, whereas the local network 102 is a foreign, non-native, or non-home network for guest computer system 110. Moreover, while guest address 124 have values in the range of address assigned to the domain for the network 102, for purposes of this invention, they are not considered "local" addresses in this domain. In other words, the guest addresses 124 are a set of reserved network addresses only assigned to guest computers that attempt to coupled to the local network domain, and are never assigned as network address to local computer systems that are part of the local domain.

When the guest computer system 110 is coupled to the sub-network 114 and is "booted," a DHCP client (not specifically shown) within the guest computer system 110 provides, via a broadcast message for example, a request for an assignment of an address on the local network 102. The DHCP address server 120 detects this request and, in this example, uses information in the request to determine that the guest computer system 110 is not a "native" or local computer system with respect to the local domain of local network 102. In one embodiment, this process alone allows the address server to then select and assign a guest address from the set of guest address 124 to the guest computer system 110 as explained above.

Alternatively, before assignment of an address (guest or local), the address server 120 can further determine the remote domain of the remote network 106 with which the guest computer system 110 purports, via the original request for an assignment of an address, to be associated. That is, based on the request for an assignment of an address, the address server 120 can determine the remote network domain (e.g. 106) with which the guest computer system 110 is associated (or at least purports to be associated). The address server 120 can then communicate with the verification computer system 130 on the remote network 106 to verify if the guest computer system 110 is actually associated with the remote domain of the remote network 106. In a specific embodiment, the address server 120 can verify the identity of the guest computer system 110 with the remote verification computer system 130. For instance, the address server 120 can receive an indication (not specifically shown) from the verification computer system 130 that indicates if the guest computer system 110 is associated with the remote network 106 (i.e., the remote domain) or not. If the guest computer system 110 is properly verified in this manner, the address server 120 then proceeds to select and assign a guest address from the set of guest address 124 to the guest computer system 110, as previously explained.

Since the system of the invention uses a set of guest addresses 124 for selection and assignment of addresses to computer systems that appear to be "foreign" to the local network 102, the invention greatly enhances security and access control to computer systems in the local network 102. This is because the system of the invention, as will be explained in more detail, can selectively route data traffic that contains a guest address on certain portions (e.g., sub-networks) of the local network 102 and not on other portions.

Figure 2:
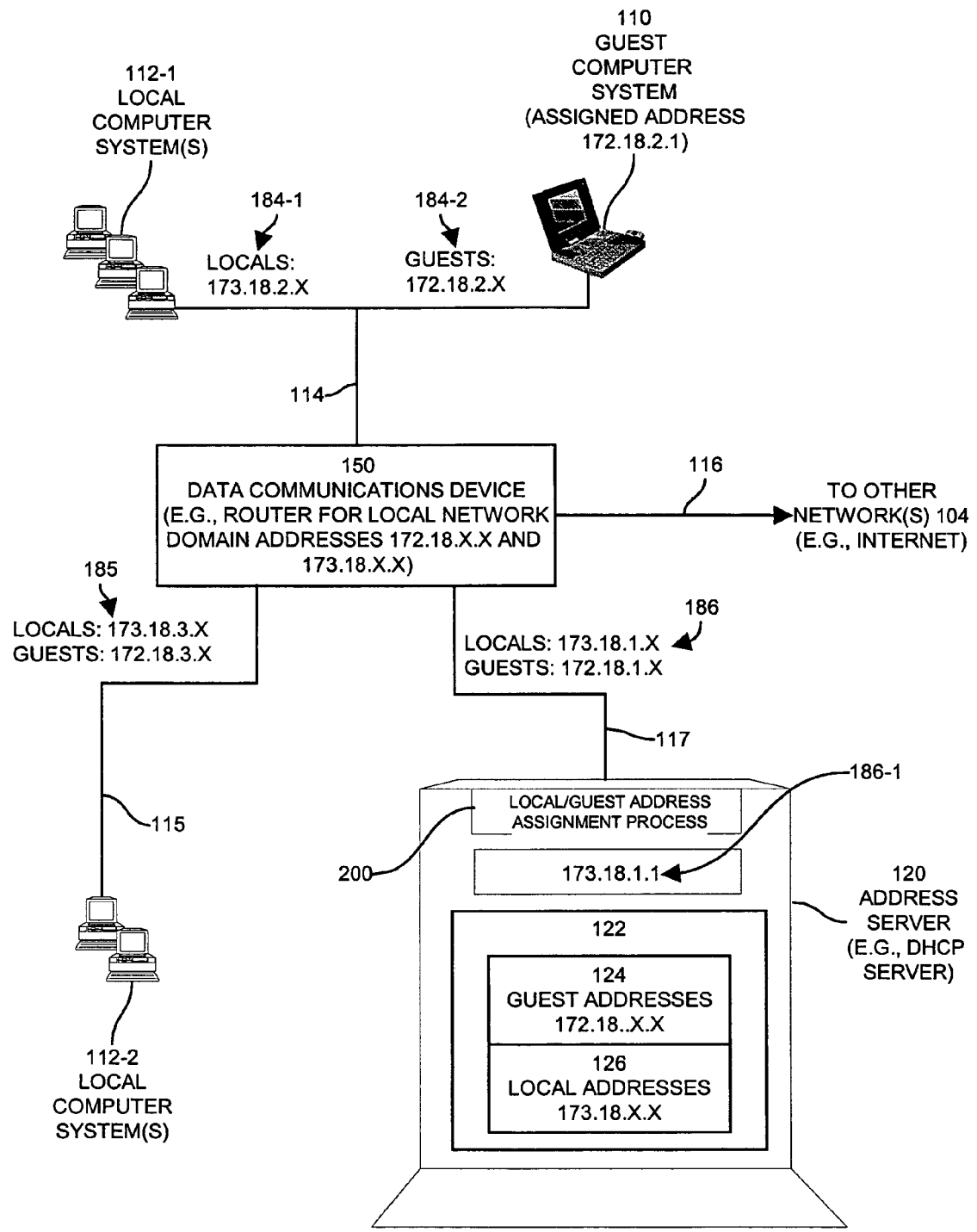
FIG. 2 illustrates how the address assignment techniques of this invention can divide address assignments in a local network into guest addresses and local address to provide each sub-network with a guest address range useable for guest computer systems (or other guest devices) and a local address range usable for local computer systems (or other local devices).

FIG. 2 illustrates how this invention provides enhanced network security and access control within the local network 102. In FIG. 2, a data communications device 150, which in this example is a router, provides a data transport mechanism for portions of data (e.g., packets) within the local network 102. In this small local network 102, each sub-network 114 through 117 interconnects to the data communications device 150. The address server 120 uses a local/guest address assignment process 200 of this invention to select and assign various IP addresses 184 through 186 to computer systems 110 (guest) and 112-1, 112-2 (local) as needed and generally as explained above. More specifically, as illustrated, the address server 120 selects specific values of addresses 184 through 186 from either the set of guest addresses 124 that have an address range of "172.18.x.x," or, from the set of local addresses 126 that have an address range of "173.18.x.x." The addresses selected (guest or local) depends upon if a particular computer system requesting an address is a local or guest computer system with respect to the local network 102. For each address range in the set of guest and local addresses 124, 126, the "x" values can range from "0" to "255", though "0" is generally reserved and is thus not assigned to any specific computer system. A systems administrator (not shown) configures the address server 120 with its own local IP address 186-1 having the value "173.18.1.1."

Effectively, using the address assignment techniques of this invention, the address server 120 provides and maintains two address ranges within each sub-network 114 through 117 within the local network 102. In a sense, the invention provides two separately addressable networks of computer systems (one guest and the other local). Within sub-network 114, local computer systems can have an address in the range of "173.18.2.x" while guest computer systems can have an address in the range of "172.18.2.x". Within sub-network 115, local computer systems can have an address in the range of "173.18.3.x" while guest computer system addresses are in the range of "172.18.3.x." Similarly, local computer systems on sub-network 117 (such as address server 120) can have addresses in the range of "173.18.1.x" while guest computer system addresses may be in the range of "172.18.1.x."

As a specific example, when the address server 120 receives a request for an assignment of an address from one of the local computer systems 112-1 coupled to the sub-network 114, the address server 120 can select and assign an unused local address in the range of "173.18.2.x," (shown as 184-1 in the figure) where "x" ranges from "1" to "255." The address server 120 selects and assigns such a local address from the set of local addresses 126. A systems administrator may thus configure and install (i.e. couple) as many as two hundred fifty four (254) local computer systems 112-1 on sub-network 114. In a similar manner, the address server 120 is configured according to this invention to select and assign guest addresses in the range of "172.18.2.x" to any guest computer systems (e.g., 110) that are coupled to the sub-network 114. In this specific example, the address server 120 selects and assigns the address "172.18.2.1" (selected from the set of guest addresses 124) to the guest computer system 110. Though not shown in this example, if other guest computer system(s) were coupled to the sub-network 114, the address server 120 might assign the next sequential guest address "172.18.2.2" to a second guest computer system, and might assign guest address "172.18.2.3" to a third guest computer system, and so forth. In this manner, computer systems that identify themselves as guest to the address server 120 are provided with guest addresses.

Once the address server 120 selects and assigns a particular address (local or guest) to particular computer system (local or guest), the address server 120 marks that address as reserved or "in use" with respect to the set of address (local or guest) from which that address was selected. The address server 120 will not select this address again for future use for another computer system until the computer system to which the address is currently assigned is finished using the address. This avoids having two computer system with the same address coupled to local network 102. The address server 120 of this invention can limit the amount of time that an assigned address is "good" for. Such time limitations during which an assigned address is useable by a particular computer system (local or guest) might be a period of minutes, hours, days, weeks, or months, or the address server 120 may allow the computer system to use an assigned address for the duration of a single data communications session. For example, the address server 120 can provide a one-session-use guest address such as "172.18.2.1" to the guest computer system 110, and can inform that guest computer system 110 that once that computer 110 is de-coupled from the local network 102, the one-session-use address will no longer be valid. If a person were to remove or de-couple the guest computer system 110 configured with such a one-session-use address, and then were to re-couple the guest computer system 110 to the local network 102 again, the guest computer system 110 would again have to negotiate with the address server 120 to obtain a new address (local or guest) for use on the local network 102.

As will be explained shortly, the system of the invention can configure the data communications devices such as the router 150 in the local network 102 in this example with knowledge of the local and guest address assignments (i.e., those addresses selected for assignment to computer systems from the set of local and guest addresses 124, 126) as maintained by the address server 120. Using this address assignment knowledge, the data communications devices (e.g., 150) in the local network 102 can selectively transport (to be explained) data portions such as packets (or cells, frames or other data units used within the network 102) that contain guest addresses in a different manner than other data portions that contain local addresses. Selectively transporting data portions increases network security and provides an access control mechanism within the local network 102.

As an example of selective transport with respect to FIG. 2, the data communications device 150 can contain knowledge of the assignment of the guest address "172.18.2.1" to the guest computer system 110. To obtain this knowledge, a systems administrator, for example, might pre-configure the data communications device 150 with "knowledge" that any data portion having a source address in the range "172.18.x.x" is to be routed/transported as a "guest" data portion and should only be transmitted on predetermined data routes (i.e., data links or other paths through the local network 102). A computer system generally includes a source address (not shown) in each data portion such as a packet that is transported on a network. The source address identifies the computer system (e.g., guest computer system 110) that originated the data portion. Alternatively, as noted above, the address server 120 can inform the data communications device 150 of each guest address assignment for each sub-network (e.g., that the address "172.18.2.1" has been assigned to the guest computer system 110 on sub-network 114) when that assignment occurs. Using this information, the data communications device 150 can, for example, only route data portions sent from (and/or received by) the guest computer system 110 (i.e., data portions having a source or destination address of "172.18.2.1") between the sub-networks 114 and 116. Selective transport of data portions in this manner thus prevents a user of the guest computer system 110 from accessing certain other computer systems on the local network 102, such as local computer systems 112-2 on sub-network 115, since the data communications device 150 does not allow data portions containing guest addresses to be routed onto the sub-network 115.

Recall that in this example of local network 102, the sub-network 116 provides access from the local network 102 to other data communications networks 104, 106 (FIG. 1), such as the Internet. Selective transporting of data portions according to this invention can provide access by the guest computer system 110 to the remote network 106, which is the "local" or home network for the guest computer system 110 in this example, and at the same time can disallow or limit access by the guest computer system 110 to other portions of the local network 102, such as sub-networks 115 and 117. The invention can thus allow, for example, the address server 120 to provide a guest address to a guest computer system (e.g., 110) that is coupled anywhere in the local network (e.g. 102) and the guest computer system can transmit data communications packets that can "tunnel" through the data communications device(s) (e.g., 150) in the local network 102 to get to that guest computer system's local network (e.g. 106 in FIG. 6). The data communications devices (e.g., 150) in the local network 102 provide this tunneling ability since each data communications device can establish selective routes for data portions containing the guest addresses based on the address assignment information received from the address server 120. This technique thus provides a "tunnel" of restricted or limited access through the local network 102 for data sent to and from the guest computer system(s) (e.g., 110).

Figure 3:
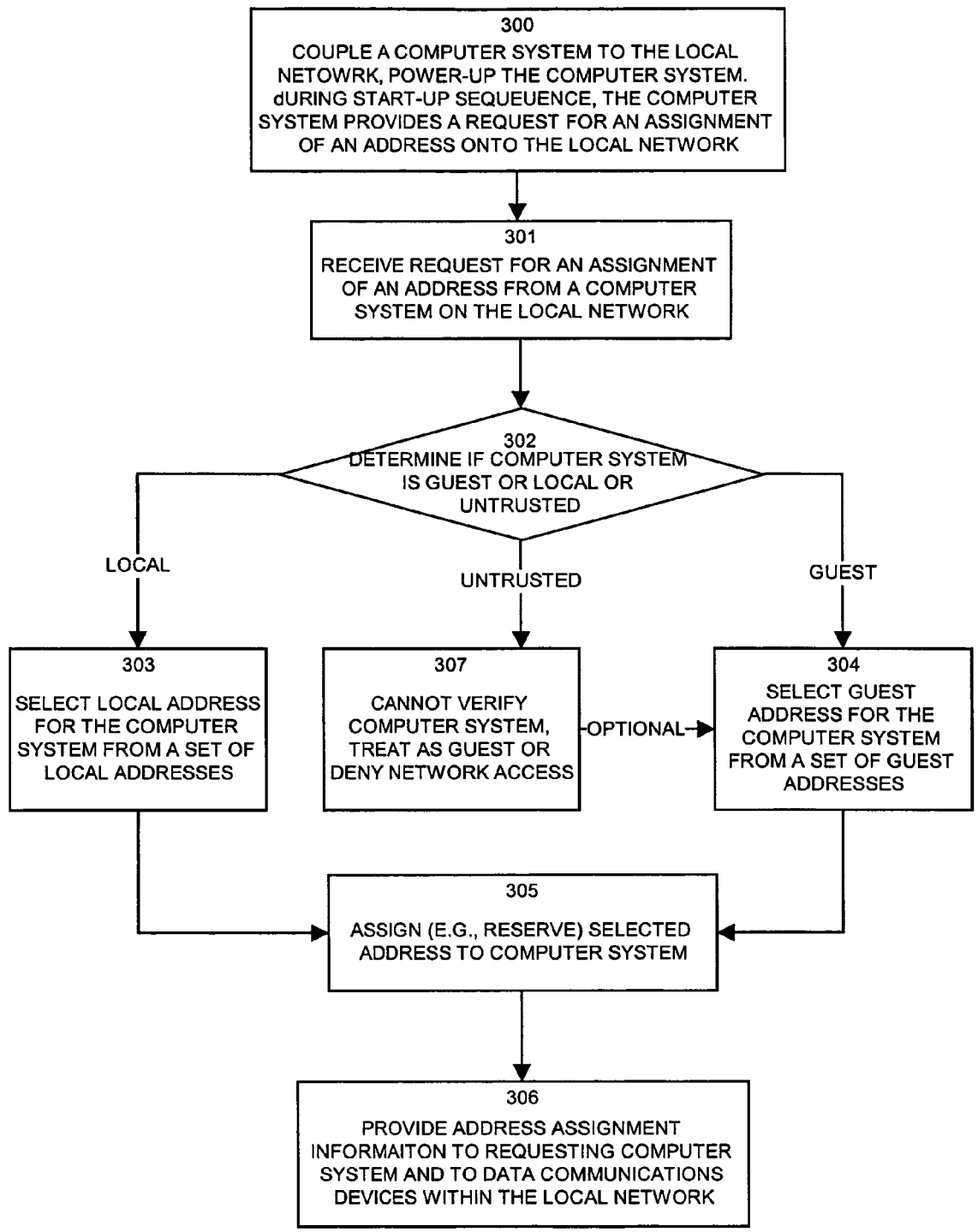
FIG. 3 is a flow chart of processing steps generally performed by embodiments of the invention to assign addresses to requesting computer systems.

FIG. 3 illustrates an example method embodiment of the invention in a flow chart of processing steps 300 through 307 which the local/guest address assignment process 200 within the address server 120 performs to assign addresses to computer systems (and/or other requesting devices) within a network such as local network 102. The processing of FIG. 3 will be explained in reference to the configuration in FIGS. 1 and 2 in which the guest computer system 110 is coupled to the local network 102 and requests an address from the address server 120. A high level review of the processing steps will be provided followed by a more detailed analysis provided thereafter including alternative processing techniques which are also part of this invention.

Initially, in step 300, the guest computer system 110 couples to sub-network 114 within the local network 102 and is powered on. Preferably, during a startup or "boot" sequence, an address assignment client process (e.g., a DHCP client) in the guest computer system 110 provides a request for an assignment of an address (not specifically shown) onto the local network 102 using a broadcast message, for example. In a preferred embodiment of the invention, the request for assignment of an address conforms to the format of a DHCP DISCOVER protocol message used by DHCP to request a network address.

The request for an assignment of an address may include any or all of the following information: 1) A name (e.g. hostname) of the requesting computer system; 2) An identity of a network domain to which the requesting computer system is associated, or to which the requesting computer system purports to be associated; 3) Any previously assigned network address that the requesting computer system may have used in the past for data communications with this (i.e. the local network 102) or another network; and 4) Authentication/Verification information including public and/or private key encrypted data (to be explained in more detail later) which the address server 120 can use to authenticate the identity of the requesting computer system (e.g. guest computer system 110 in this example).

In step 301, the address assignment process 200 within the address server 120 receives the request for an assignment of an address, including some or all of the information outlined above, from the requesting computer system (the guest computer system 110 in this example). In step 302, the address assignment process 200 determines if the computer system requesting the address is a guest computer system, a local computer system, or neither. The operation of step 302 is preferably performed based upon the above described information provided to the address server 120 in the request for an assignment of an address.

The address assignment process 200 in the address server 120 may perform step 302 in a variety of ways. In a simple example of a very trusting network environment, the requesting computer system (guest computer system 110) can simply indicate within its request for an assignment of an address its purported status as a guest or local computer system. The address server 120 can simply trust this assertion and select and assign an address accordingly (steps 303, 304, to be explained). Alternatively, a more robust technique of the invention which is better adapted for public use networks or un-trusted network environments provides the use of public key encryption technologies to verify the purported domain and identity of the computer system requesting an address. The encryption verification and authentication techniques and embodiments of the invention that provide such techniques will be described in more detail later.

If step 302 determines that the requesting computer system is a local computer system (e.g., one of 112-1 or 112-2), then the address assignment process 200 performs step 303 to select a local address for the requesting computer system from the set of local addresses 126 maintained within the address server 120. Alternatively, if step 302 determines that the requesting computer system is a guest computer system, then the address assignment process 200 performs step 304 to select a guest address for the requesting computer system (e.g., 110) from the set of guest addresses 124 maintained within the address server 120. Alternatively, if the address assignment process in step 302 cannot verify the identity or authenticity of computer system requesting the address, then the address assignment process 200 determines that the requesting computer system is neither a guest computer system nor a local computer system and thus performs step 307 which can either deny access to the local network 102 by not assigning any address to the requesting computer system, or alternatively, the address assignment process 200 can default to step 304 to assign a guest address to the requesting computer system (as illustrated by the OPTIONAL arrow from step 307 to step 304). In the specific example in FIG. 2, the address assignment process in the address server 120 selects, via step 304, the guest address "172.18.2.1" for use by the guest computer system 110.

If the address assignment process 200 selects either a local or a guest address for the requesting computer system, the address assignment process 200 performs step 305 to assign or "reserve" the selected address to the computer system within the address server 120. In other words, the address assignment process 200 in step 305 causes the selected address to be unavailable for further selection or use by other computer systems, since it has now been selected and assigned for use by a specific computer system (110 in this example). The assigned address may remain assigned or reserved until it is released by the computer system which requested the address, or the address assignment process 200 may automatically expire the address assignment (guest or local) after a period of time or in response to an external event. When an address assignment expires, the address (guest or local) assigned to a computer system is no longer valid on the network 102, and the computer system must re-negotiate with the address server 120 for the assignment of a new address.

After step 305, the address assignment process 200 performs step 306 to provide the address assignment information (e.g., the selected and assigned address in this example) to the requesting computer system. The address assignment process 200 may also, in step 306, provide address assignment information in the form of a list of all guest addresses, or a range of guest addresses, a specific guest address, or other information concerning which addresses within the local network 102 are guest addresses versus which addresses are local addresses to the data communications devices such as router 150 within the local network 102.

The portion of step 306 that provides address assignment information to data communications devices within the local network 102, which is optional, allows the data communications devices (e.g., 150) which form the local network 102 to become dynamically aware of guest addresses in use at various times within the local network 102. Guest address information can be used by the data communications devices such as the router 150 in the local network 102 to selectively transport (e.g., route) data portions such as packets, cells, etc. that contain guest addresses on the local network in a different manner than other data portions that contain local addresses, as explained in the former example of selective transport. Thus, in one embodiment, each time a new guest address is selected and assigned via steps 300 through 307, the address server 120 can make each data communications device in the local network 102 aware of this new address assignment.

The address assignment information that the address assignment process 200 conveys to each data communications device in the local network 102 in step 306 may include an identity of the sub-network upon which the guest computer system using the assigned guest address is coupled. For example, the address assignment information may indicate that the guest computer system 110 has been assigned guest address "172.18.2.1" and is coupled to sub-network 114. This information allows the data communications devices such as the router 150 in FIG. 1 for example, to create special "tunnel" routes or network paths between the sub-network (e.g., 114) containing the guest computer system (e.g., 110) and a sub-network such as 116 in FIG. 1 that couples the local network 102 to other networks 104, 106 such the Internet or the guest computer system's remote network 106. Each data communications device can configure the special tunnel routes to channel all data containing a specific guest address in either the source or destination fields of a data portion to and from only those selected routes. In other words, all data sent to and from the guest computer system within the local network 102 is limited to being transported only to and from the guest computer system and specific destinations such as the Internet. This allows the remaining sub-networks such as 115 and 117 in FIG. 1 to be secure and insulated from any data portions created by the guest computer system 110. Thus, if the guest computer system 110 were put to malicious use within the local network (e.g., such as being controlled by a hacker who secretly coupled the guest computer system 110 into the local network 102), the address assignment mechanisms of this invention limits the number of computer systems that are accessible by the guest computer system 110 within the local network 102.

Figure 4:
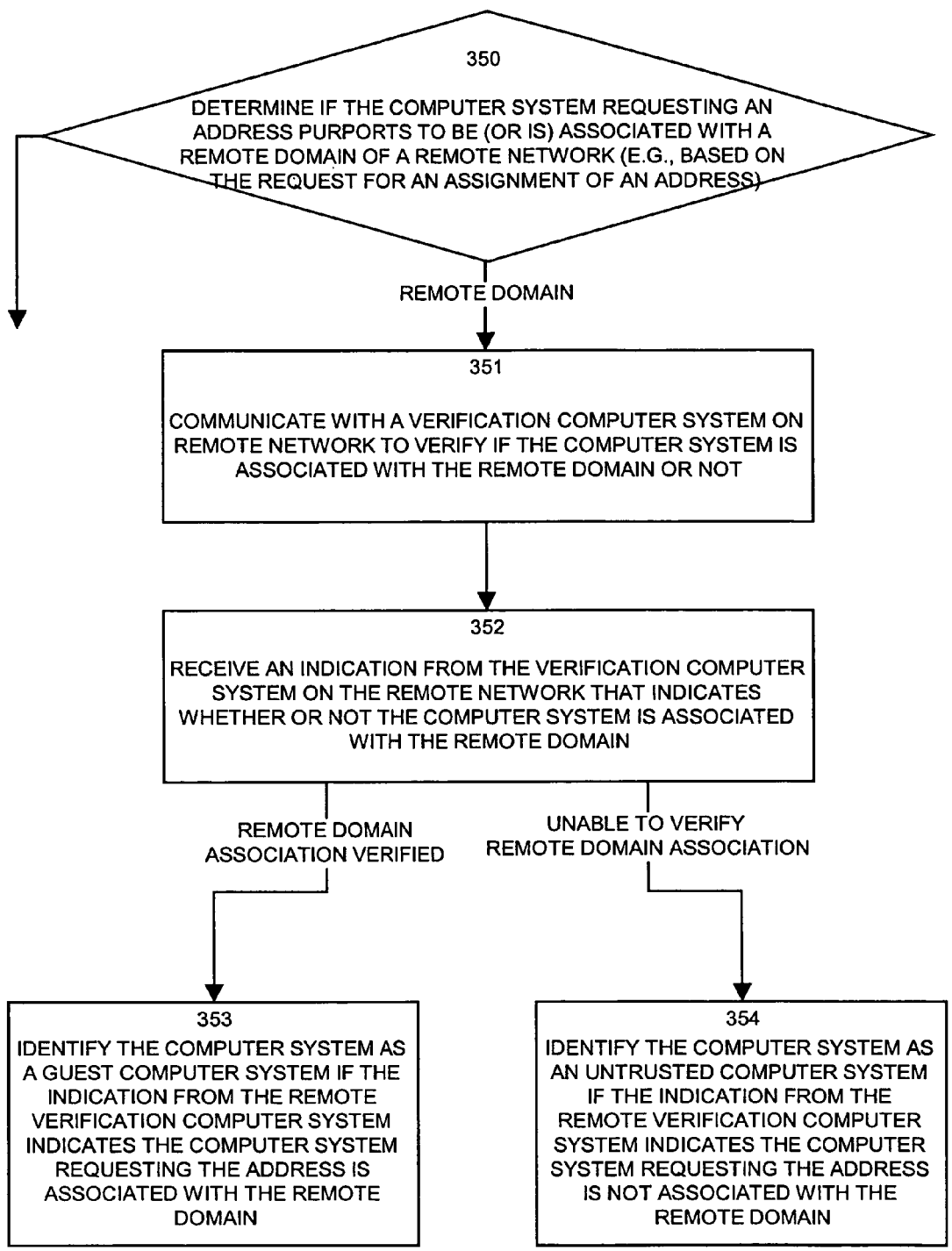
FIG. 4 is a flow chart of processing steps performed by the address server in one embodiment of this invention to verify and authenticate a guest computer system requesting an address with a remote domain to which that guest computer system purports to be associated.

FIG. 4 illustrates in more detail an example method embodiment of the invention that is performed by the address assignment process 200 to carry out the operation described above in step 302 of FIG. 3. That is, FIG. 4 illustrates the processing of the invention that determines if a computer system is a guest computer system, a local computer system, or neither a guest nor a local computer system. It is to be understood that the processing steps 350 through 354 in FIG. 4 are an example embodiment of processing that can be performed within step 302 in FIG. 3 and that other variations of this processing are contemplated as being within the scope of this invention.

In step 350, the address assignment process 200 determines if the computer system requesting an address purports to be (or is) associated with a remote domain of a remote network, such as remote network 106 in FIG. 1. The address assignment process 200 can make such a determination based on the request for an assignment of an address received from the requesting computer system, which is the guest computer system 110 in this example. By using various authentication and verification techniques which will be presented in detail shortly, the address assignment process 200 in step 350 can essentially verify the identity of the requesting computer system. In a simple example, the address assignment process 200 may look in a table (not specifically shown in figures) of local hosts to determine if the identity provided (or verified) from the requesting computer system is a computer system associated with the local network 102 or a remote network (e.g., 106). If the address assignment process 200 verifies that the computer system requesting an address is a local computer (i.e., is associated with the local domain), then processing proceeds to step 303 in FIG. 3 for selection of a local address. However, if the address assignment process 200 in step 350 determines that the computer system requesting an address is associated with a remote domain, processing proceeds to step 351.

When processing reaches step 351, the address assignment process 200 has determined that the requesting computer system is not native to the local network 102. As such, in steps 351 and 352 of this embodiment, the address assignment process 200 attempts to verify the authenticity of the computer system requesting an address by communicating with a verification computer system (e.g., 130) on a remote network (e.g., 106) to verify if the computer system is associated with the specified remote domain (the domain purported in the request for an assignment of an address) or not. In one embodiment, this is done by having the address assignment process 200 query the remote verification computer system 130 within the remote network 106 of the remote domain (e.g., the remote domain determined in step 350) to check if the requesting computer system is a registered host of that domain. The remote verification computer system 130 receives such a query and can respond with an indication of whether or not the computer system specified in the query is a member (i.e., is a local computer system) of the domain of the remote verification computer system 130.

In step 352, the address assignment process 200 receives an indication from the remote verification computer system 130 on the remote network 106 that indicates whether or not the computer system requesting an address is associated with the remote domain. To this end, the address assignment process 200 can obtain a verification that that computer system requesting the address is authentic and is actually associated with the remote domain to which it claims to be associated. An example of a specific verification process will be explained shortly.

If the address assignment process 200 in step 352 receives an indication that the remote domain association is verified and is correct for the computer system requesting the address (e.g., 110), then the address assignment process 200 processes step 353 to identify the computer system requesting the address as a guest computer system. Alternatively, if the address assignment process 200 receives an indication that the remote domain association is unable to be verified, then the address assignment process 200 processes step 354 to identify the computer system requesting the address as an untrusted computer system. Steps 353 and 354 thus provide an address selection criteria to be used upon completion of step 302 in FIG. 3.

As noted above, embodiments of the invention can provide additional security via encryption, verification and authentication techniques employed for communications between components such as the computer systems 112, 110, the address servers 120, 130 and even the data communications devices such as the router 150. Verification and authentication techniques employed by this invention can be used to verify and authenticate the identity of two components communicating with each other. This avoids instances of component spoofing, where one component in a communications exchange is actually an imposter and is falsifying it's identity. For example, the address assignment process 200 can use key encryption and verification techniques in step 302 to authenticate and verify that the requesting computer system is either a guest computer system, a local computer system, or neither a guest nor a local computer system. Likewise, a computer system requesting an address can use similar verification/authentication techniques to ensure that the computer system is communicating with a valid address server 120. That is, these techniques can be used by each component (e.g., computer system, address server, data communications device, etc.) to verify the other component in a communications session.

Generally, in such embodiments, the address servers 120, 130 and computer systems 112, 110 provide, and use, two cryptographic keys (not specifically shown in figures): a public key and a private key. In these embodiments, system components (e.g., the address servers, computer systems and data communications devices) make their public key viewable and available to all other components in the system (i.e., components can "see" and get copies of the public key(s) of other components). Each component also maintains a private key that remains confidential to the component and is used to decrypt messages sent to that component that were encrypted with that component's public key.

Using these techniques, if a system component receives a message which purportedly originated from a certain other component, the receiving component can verify the authenticity of the message. In other words, the receiving component can guarantee that the component claiming to have originated the message was the true originator of the message and not another device that imposters the component. This is because a message encrypted with a public key of a component (e.g., an address server) is only properly de-cryptable with the private key of that component. Thus, if another host had been impostering (i.e., impersonating) a certain component (i.e., a computer system poses with the identity of an address server), messages generated by the impostering component will not be decrypted properly by the public key of the address server 120 since they were not encrypted with that address server's actual private key. An example best illustrates the use of key encryption authentication and verification techniques between two components in accordance with the system of the invention.

In step 300 of FIG. 3, when the guest computer system 110 sends the request for an assignment of an address to the address server 120, the guest computer system 110 can first obtain or look up the public key associated with the address server 120. Each component can provide a public key, for example, upon a request for the public key or a key server database (not shown) within the local network 102 can maintain a list of public keys for each component. For example, for local computer systems 112, the address server 120 can maintain a public key database or table (not shown) that is indexed by the hostnames of the various local computer systems 112. A component such as the guest computer system 110 can request a specific public key from the address server 120 via a broadcast message (since the guest computer system 110 does not yet have an address for use on the local network 102) on the local network 102. Once the guest computer system 110 obtains the public key for the address server 120, the guest computer system 110 sends, in step 300 of FIG. 3, the request for an assignment of an address encrypted in part with the address server's (120) public key onto the local network 102 (e.g., via a broadcast DHCPDISCOVER message) for receipt by the address server 120 (operating as a DHCP server in this example). Only the address server's (120) private key can decrypt the encrypted part of the request for an assignment of an address message that is encrypted with that address server's (120) public key. In this manner, secure messaging is accomplished and other computer systems or data communications devices (e.g., 112, 150) on the local network 102 cannot decipher the request for an assignment of an address sent from a particular computer system (local or guest).

Furthermore, using similar key encryption techniques, the address server 120 can authenticate or verify the identity of the requesting computer system (guest computer system 110 in this example). In other words, the address server 120 can prove that the guest computer system (or any computer system or device that requests an address for that matter) is "who" it claims to be. For example, when an address server 120 receives a request for an address containing a purported domain of the requesting computer system, the requesting computer system can supply the purported domain within the request message both in clear text (e.g., unencrypted) and in the doubly encrypted format (described below). When the address server 120 fully decrypts the doubly encrypted domain name, the address server 120 can compare the result with the clear text version of the domain name. If they are the same, then the decryption worked properly which indicates that the computer system requesting the address is authentic. This prevents a computer system or device from spoofing, impostering or otherwise passing off itself (e.g., a guest) as another (e.g., a local) computer system.

In embodiments of the invention that require such verification techniques, the guest computer system 110 is required to encrypt a portion of the original request for an assignment of an address, such as the purported domain of the guest computer system, with the guest computer system's own private key. Then, the guest computer system encrypts this result with the address server's 120 public key. The guest computer system then transmits this doubly encrypted domain name within the request for an assignment of an address in step 300 to the address server 120. Upon receipt of such a doubly encrypted domain name, the address server 120 receives the message in step 301 and decrypts it twice, first with the address server's 120 own private key, and then with the guest computer system's 110 public key. If the address server 120 obtains as a result a valid (e.g., a readable) domain name (i.e., a remote or local domain that is reachable within networks 102, 104, or 106), then the address server 120 can be sure that the message came from the guest computer system 110 and not from another impostering computer system. Also, the address server 120 can be assured that no other computer system other than the guest computer system 110 can read messages exchanged in this manner.

It is to be understood by those skilled in the art that other communications between various other system components can be secured and verified in a similar manner as explained above with respect to the doubly encrypted communications that take place between the guest computer system and address server 120. For instance, when the local address server 120 communicates with the remote verification computer system 130 to determine if the computer system requesting an address (e.g., guest computer system 110) is a member of the remote domain of the remote network 106, the verification technique explained above can be applied in this situation so that the address server 120 and the address server/verification computer system 130 can each verify the other's identity. This prevents a malicious attempt by a computer system hacker of providing a spoofing remote verification computer system (e.g., a false computer posing as the remote verification computer system 130) on a remote network (i.e., a network other than remote network 106) that might otherwise indicate that a malicious guest computer system attempting access to local network 102 is verifiable. In other words, since the local address server 120 can verify and authenticate the identity of the remote verification computer system (because only this remote verification computer system has access to its private key), the address server 120 can securely and accurately verify and authenticate the identity of the computer system requesting an address.

The general operation of the key encryption authentication and verification techniques discussed above provide secure and authenticated data transport and also allow for verification of the identity of a sender and/or receiver of messages. For further information on the operation and use of public and/or private key encryption technologies for authentication and verification purposes, the reader is directed to "Applied Cryptography" Second Edition, authored by Bruce Schneier, published in 1996 by John Wiley & Sons. The entire teachings and contents of this reference are incorporated herein by reference.

It is to be understood that preferred embodiments of the system of the invention adhere to the standards-based DHCP protocol. DHCP provides the ability to include user defined data within standard DHCP messages. For instance, when a computer system requests an assignment of an address, a DHCPDISCOVER message can contain the clear text and the doubly encrypted domain information in an OPTION field of the DHCP protocol message. Likewise, when an address server 120 responds to a requesting computer system with a guest or local address for use on the local network 102, an OPTION field of the DHCP message (i.e, a packet) can contain a clear text and a doubly encrypted version of a hostname and/or user name (e.g., name of person requesting an address for their computer) associated with the requesting computer system along with the selected and assigned guest or local address. This information can be doubly encrypted as explained above to provide security and authenticity verification. Upon receipt of the address assignment message at the computer system, the computer system can decrypt the hostname and/or username and compare it to the clear text version of the hostname and/or username to ensure that the originator of the return message containing the assigned address (local or guest) for use on the network is a valid authenticated address server (e.g., 120) and not an imposter. The option field available in DHCP messages is thus one mechanism which embodiments of the invention can use to transport verification information such as encrypted hostnames and domain names.

It is to be understood that the address server 120 configured according to the invention can be any type of computer system. Computer systems of this sort generally include an interconnection of: 1) one or more network interfaces for coupling to a sub-network within a local network; 2) a memory system encoded with the address assignment process (e.g. 200) as a series of executable or otherwise performable instructions; and 3) one or more processors or central processing units that can perform the address assignment instructions encoded within the memory system. The address server 120 in FIG. 1 is understood to include such elements, though the processor(s) and memory are not specifically shown. The address server 120 configured in this manner can operate according to the operations, techniques and steps discussed above.

While this invention has been particularly shown and described with references to preferred embodiments thereof, it will be understood by those skilled in the art that various changes in form and details may be made therein.

For example, while certain aforementioned embodiments include encryption and verification techniques to provide a more secure and robust address assignment operation, the invention can operate without the additional overhead of such security measures. Moreover, while the processing steps in FIG. 4 include operations to access a remote network (e.g. 106) to verify the purported domain of an unrecognized guest computer system (e.g., 110) to enhance the features of step 302 in FIG. 3, the processing of FIG. 4 is optional in certain embodiments of the invention. As such, the address server 120 can make the determination of whether a requesting computer system is a guest or local computer system, for example, based solely on information obtained from the communications between the address server 120 and the requesting computer system (110 in the example).

According to another variation of the invention, there may be multiple classes or sets of guest addresses 124. In such an embodiment, the address server 120 might assign a first guest address selected from a first set of guest addresses to a first requesting guest computer system based on an identity of the first requesting guest computer system, and may assign a second guest address selected from a second set of guest addresses to a second requesting guest computer system based on an identity of the second requesting guest computer system. Data communications devices (e.g. router 150) with the local network 102 might have certain routes (e.g., less restrictive) established for data communications messages (e.g., packets) that contain an address in the range of the first set of guest addresses, while the data communications devices may configure other routes (e.g., more restrictive) for data communications message that contain an address from the range of addresses in the second set of guest addresses.

In other words, the address server 120 can support different classes of local network access by assigning guest addresses to computer systems from different sets or classes of guest addresses. A less restrictive class of guest addresses might allow a guest computer system containing an assignment of a less restrictive guest address to have access to (i.e., to successfully send packets to or receive packet from) a certain sub-network within the local network 102, while another guest computer system that has been assigned (by the address server 120) a more restrictive guest address from a set of more restrictive guest addresses might be denied access to that same sub-network.

The address server 120 can maintain each set of guest addresses (two or more sets) and can assign a particular address for a requesting computer system from one of the sets based on the verified identity of the requesting computer system. For instance, in a corporate networking environment, if a computer system purports to be from a friendly domain of a non-competing company, the address server 120 might verify this assertion and assign a less restrictive guest address to allow the requesting computer system to have access to a file or print server (or another computerized device) on a particular sub-network to store and retrieve files within the corporate local network 102. However, if another (i.e., a second) guest computer system from a directly competing corporation were coupled to the local network 102, the address server 120 might determine that since the purported and verified domain of the second guest computer system is a domain of a direct commercial competitor of the corporation controlling the local network 102, a more restrictive guest address selected from another set of guest addresses should be assigned to the second guest computer system. In other words, the address server 120 provides a more restricted guest address to the second guest computer to help prevent theft of corporate information, trade secrets or the like via access to sensitive computer systems located elsewhere on the local network 102. In this instance, the data communications devices in the local network 102 can be configured to only provide a "tunnel" to the Internet for computer systems having a more restrictive address selected from the second set of guest addresses. The second guest computer system would therefore be denied access to the file or print server sub-network in this example, and might only be granted access out to the Internet 104.

These and other changes and their equivalents are considered embodiments of the invention and can be incorporated into the invention without departing from the spirit and scope of the invention as defined by the appended claims.

What is claimed is:

1. A method for assigning addresses to requesting computer systems comprising:
   receiving, under a dynamic address assignment protocol, a broadcast discovery message as a request for an IP address from a computer system coupled to a first subnetwork of a local area network, wherein the broadcast discovery message includes clear data and encrypted data;
   determining if the computer system is registered to a local domain by verifying the identity of the computer system from the request for an IP address using the clear data and encrypted data;
   assigning a local address on the first subnetwork if the computer system is registered to the local domain, the local address operable for access to the local area network; and
   if the computer system is not registered to the local domain:
      designating the computer system as a guest computer system;
      assigning a guest address on the first subnetwork operable for selective transport on predetermined portions of the local area network; and
      propagating assignments of addresses to communications devices operable to selectively route traffic to at least one guest address path, which includes:
         identifying a second subnetwork, the second subnetwork including restricted nodes;
         defining tunnel routes as selected routes separate from the second subnetwork; and
         routing guest traffic on the tunnel routes.

2. The method of claim 1 further comprising:
   maintaining a bank of guest addresses operable for guest address allocation for transporting guest traffic;
   maintaining a bank of local addresses operable for local address allocation for transporting local traffic; and
   selecting one of either an address from the bank of guest addresses and an address from the bank of guest addresses for selectively assigning to the requesting computer system.

3. The method of claim 2 further comprising:
   identifying a set of local routing paths interconnecting predetermined subnetworks;
   determining guest address paths distinct from the local routing paths; and
   routing the guest traffic only on the guest address paths.

4. The method of claim 3 wherein the guest traffic further comprises message traffic having a guest address in at least one of the source and destination fields.

5. The method of claim 2 wherein determining the identity of the requesting computer system further includes:
   determining a subnetwork which the requesting computer system has become coupled to
   verifying the domain of the requesting computing system by authenticating a credential provided by the requesting computer system.

6. The method of claim 1 wherein the request for an IP address from the computer system comprises at least one of a hostname, key encryption data, a network domain and a previously assigned address.

7. The method as in claim 1, further comprising:
   wherein propagating assignments of addresses to communications device includes propagating assignments of addresses to at least one router;
   wherein routing guest traffic on the tunnel routes includes:
      at the at least one router:
         receiving at least one data packet at the least one router;
         detecting a source of the data packet as corresponding to the guest computer system based on a guest address assigned to the guest computer system; and
         in response to detecting the guest address, determining transport of the first packet via the tunnel routes such that the at least one data packet avoids transport via the subnetwork of restricted nodes to a destination described by the at least one data packet.

8. The method of claim 1 wherein the clear data and encrypted data is included in an option field of the broadcast discovery message.

9. The method of claim 1 wherein the clear data and encrypted data comprise at least one of a hostname, a domain name, or a username.

10. The method of claim 9 wherein the encrypted data is doubly encrypted using an encryption key of the computer system and an encryption key of an address server.

11. A data communications device for assigning addresses to requesting computer systems comprising:
    a network interface to receive, under a dynamic address assignment protocol, a broadcast discovery message as a request for an IP address from a requesting computer system coupled to a local area network, wherein the broadcast discovery message includes clear data and encrypted data;
    an address server to assign a local address if the requesting computer system is registered to a local domain and if the requesting computer system is not registered to the local domain by verifying the identity of the requesting computer system from the request for an IP address using the clear data and encrypted data, further configured to:—
  designate the requesting computer system as a guest computer system; and
  assign a guest address operable for selective transport on a first subnetwork of the local area network, the address server to employ the network interface to propagate assignments of addresses to communications devices to selectively route traffic to at least one guest address path, the address server further configured to:
    identify a second subnetwork of restricted nodes;
    define tunnel routes as selected routes separate from the second subnetwork; and
    route guest traffic on the tunnel routes.

12. The data communications device of claim 11 further comprising:
  a bank of guest addresses operable for guest address allocation for transporting guest traffic;
  a bank of local addresses operable for local address allocation for transporting local traffic, the address server further configured to select one of either an address from the bank of guest addresses and an address from the bank of guest addresses for selectively assigning to the requesting computer system.

13. The data communications device of claim 12 wherein the address server is further configured to:
  identify a set of local routing paths interconnecting predetermined subnetworks within the network;
  determine guest address paths distinct from the local routing paths; and
  route the guest traffic only on the guest address paths.

14. The data communications device of claim 13 wherein the guest traffic further comprises message traffic having a guest address in at least one of the source and destination fields.

15. The data communications device of claim 12 wherein the address server is operable to:
  determine the first subnetwork which the requesting computer system has become coupled to; and
  verify the domain of the requesting computing system by authenticating a credential provided by the requesting computer system.

16. The data communications device of claim 11 wherein the request for an IP address from the requesting computer system comprises at least one of a hostname, key encryption data, a network domain and a previously assigned address.

17. A computer program product having a computer readable medium operable to store computer program logic embodied in computer program code encoded thereon for assigning addresses to requesting computer systems comprising:
  computer program code for receiving, under a dynamic address assignment protocol, a broadcast discovery message as a request for an IP address from a computer system coupled to a first subnetwork of a local area network, wherein the broadcast discovery message includes clear data and encrypted data;
  computer program code for determining if the computer system is registered to a local domain by verifying the identity of the computer system from the request for an IP address using the clear data and encrypted data;
  computer code for assigning a local address on the first subnetwork if the computer system is registered to the local domain, the local address operable for access to the local area network;
  computer code for designating the computer system as a guest computer system and assigning guest addresses on the first subnetwork operable for selective transport on predetermined portions of the network, if the computer system is not registered to the local domain;
  computer code for propagating assignments of addresses to communications devices operable to selectively route traffic to at least one guest address path, which includes:
  computer code for identifying a second subnetwork, the second subnetwork including of restricted nodes;
  computer code for defining tunnel routes as selected routes separate from the subnetwork; and
  computer code for routing guest traffic on the tunnel routes.

18. A data communications device for assigning addresses to requesting computer systems comprising:
  means for receiving, under a dynamic address assignment protocol, a broadcast discovery message as a request for an IP address from a computer system coupled to a first subnetwork of a local area network, wherein the broadcast discovery message includes clear data and encrypted data;
  means for determining if the computer system is registered to a local domain by verifying the identity of the computer system from the request for an IP address using the clear data and encrypted data;
  means for assigning a local address on the first subnetwork if the computer system is registered to the local domain, the local address operable for access to the local area network; and
  means for selectively assigning a guest address on the first subnetwork operable for selective transport on predetermined portions of the network, if the computer system is not registered to the local domain;
  means for propagating assignments of addresses to communications devices operable to selectively route traffic to at least one guest address path, which includes:
  means for identifying a second subnetwork, the second subnetwork including of restricted nodes;
  means for defining tunnel routes as selected routes separate from the second subnetwork; and
  means for routing guest traffic on the tunnel routes.

* * * * *

UNITED STATES PATENT AND TRADEMARK OFFICE
CERTIFICATE OF CORRECTION

| | | |
|---|---|---|
| PATENT NO. | : 7,792,993 B1 | Page 1 of 1 |
| APPLICATION NO. | : 10/921663 | |
| DATED | : September 7, 2010 | |
| INVENTOR(S) | : John Hopprich et al. | |

It is certified that error appears in the above-identified patent and that said Letters Patent is hereby corrected as shown below:

On the Title Page item 63

In the left column, add a new item as follows.

--Related U.S. Application Data
This application is a Continuation of application Ser. No. 09/536,648, filed March 27, 2000, now U.S. Pat. No. 6,792,474.--

Signed and Sealed this
Tenth Day of May, 2011

David J. Kappos
*Director of the United States Patent and Trademark Office*